United States Patent [19]

Lee

[11] Patent Number: 4,872,401
[45] Date of Patent: Oct. 10, 1989

[54] DEVICE FOR INPROVING THE FLAVOR OR REMOVING THE PIQUANTE FLAVOR OF FERMENTED PRODUCTS

[76] Inventor: Wen-bin Lee, No. 164, Cheng-Kung Rd., Feng-Yuan City Taichung Hsien, Taiwan

[21] Appl. No.: 215,335

[22] Filed: Jul. 5, 1988

[51] Int. Cl.⁴ .............................................. A23L 3/32
[52] U.S. Cl. ...................................... 99/275; 206/818
[58] Field of Search ............... 206/818; 99/275, 323.1, 99/323.2, 323.3, 277.1, 467, 485; 426/237

[56] References Cited

U.S. PATENT DOCUMENTS 3,831,743  8/1974  Leedy .................................. 206/818
4,781,773  11/1988  Instance .............................. 206/818

FOREIGN PATENT DOCUMENTS 294298  7/1928  United Kingdom ................ 206/818

Primary Examiner—Robert W. Jenkins
Attorney, Agent, or Firm—Lee C. Robinson, Jr.

[57] ABSTRACT

An apparatus for improving the flavor of and removing the flavor of a fermented substance such as wine, sauce, tobacco or the like which includes a container including a surrounding side wall, and a plurality of elongated magnetic members mounted on an inner side of the surrounding side wall. Like poles of the magnetic pieces are placed adjacently so as to induce a high density magnetic field inside the container.

4 Claims, 4 Drawing Sheets

DEVICE FOR INPROVING THE FLAVOR OR REMOVING THE PIQUANTE FLAVOR OF FERMENTED PRODUCTS

BACKGROUND OF THE INVENTION

This invention relates to an apparatus for improving the flavor of or removing the piquante flavor of fermented products, wines, soy sauce, tobacco or the like, and more particularly to an apparatus which accomplishes the above-described function by means of a magnetic field.

It is known that a magnetic field may affect the properties of a substance. For example, the moisture in air can be decomposed, by a magnetic field, into positively charged particles of greater size and negatively charged particles of smaller size. Some people believe that, when the negatively charged particles are dissolved in water, the water may have a pleasant flavor as well as provide a therapeutical effect. It is also believed that negatively charged ions gathering around a waterfall is a natural phenomenon caused by the effect of the magnetic field of the earth.

In common practice, substances which are produced by fermentation process, such as wines, beers, soy sauce, tobacco etc., are necessarily held for a long period, before use, so as to obtain a good flavor or eliminate the piquante flavor thereof. Fortunately, the inventor of this application has found that a magnetic field can beneficially affect the flavor of these substances.

SUMMARY OF THE INVENTION

An object of the invention is to provide magnetic apparatus for improving the flavor of or removing the piquante flavor of wines, beers, soy sauce, tobaccos etc., within a short period of time.

The present invention provides an apparatus which includes a container and a means for inducing a magnetic field inside the container.

In one aspect of the invention, the container includes a surrounding side wall, and a plurality of elongated magnetic members mounted on an inner side of the said surrounding side wall, each of the magnetic members having a first pole and a second pole, the first pole of each magnetic member being placed adjacent to the first poles of adjacent other magnetic members, and the second pole of each of the magnetic members being placed adjacent to the second poles of adjacent other magnetic members, thereby inducing a magnetic field of high density inside the container.

The invention also provides a method for removing the piquante flavor of a fermented substance such as wine, soy sauce, tobacco or the like which comprises placing the substance in a closed container, and inducing a magnetic field inside the container.

The exemplary preferred embodiment will be described in detail with reference to the accompanying drawings.

DETAILED DESCRIPTION OF THE PREFERRED EMBODIMENT

Figure 1:
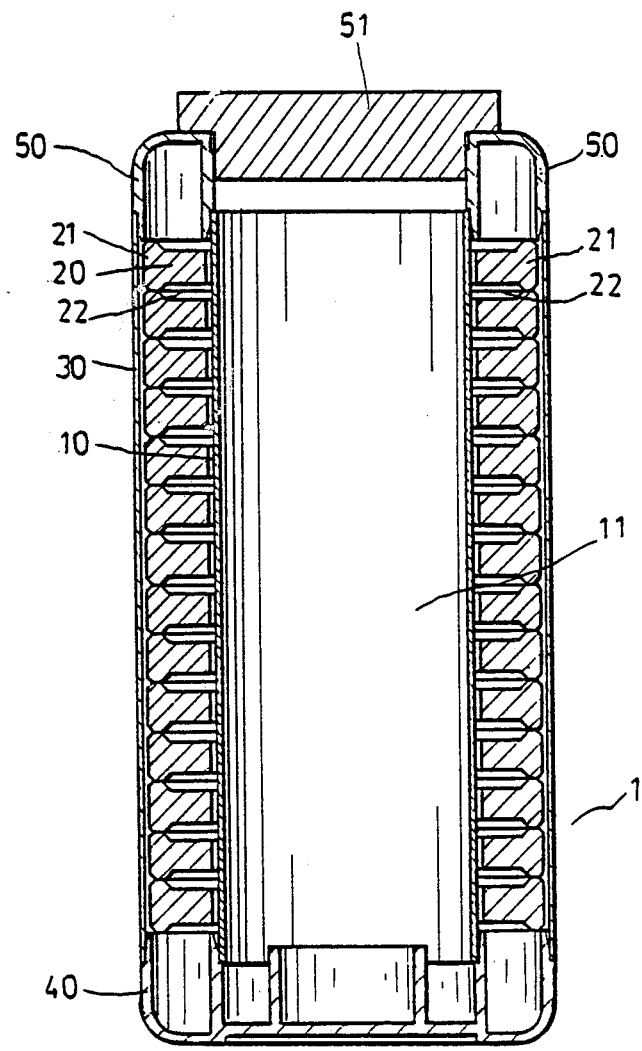
FIG. 1 is a sectional view of a preferred embodiment of the present invention.

Referring to FIG. 1, a preferred embodiment of the present invention is shown, including an inner cylindrical shell 10, a plurality of annular magnetic pieces 20 and an outer cylindrical shell 30.

The inner shell 10 confines an accommodating chamber 11 and is made of a magnetically conductive material. The outer shell 30 surrounds the inner shell 10, confining an annular chamber for receiving the magnetic pieces 20.

The magnetic pieces 20 are placed around the inner shell 10 and stacked on each other. Each magnetic piece 20 has a peripheral flange 21 which are in contact with the peripheral flanges 21 of the adjacent upper and lower magnetic pieces 20, thereby leaving gaps 22 between adjacent magnetic pieces 20. The pieces 20 are stacked in such a manner that the south pole of each piece 20 is adjacent to the south pole of the other piece 20 and the north pole of each piece 20 is adjacent to the north pole of the adjacent other piece 20, thereby generating a high density magnetic field at the inside of the inner shell due to the repulsion of the identical poles.

A bottom 40 is connected integrally to the bottom side of the inner and outer shells 10 and 30, and a top member 50 with a cover 51 is connected to the upper side of the inner and outer shells, thereby holding firmly the magnetic pieces 20 between the inner and outer shells.

When a wine, soy sauce, or the like is placed in the container 1 for a period of time, for instance, 10 -15 mins, it is found that the piquante flavor of the substance can be removed. Certainly, the flavor thereof can be improved more effectively with more time.

Figure 2:
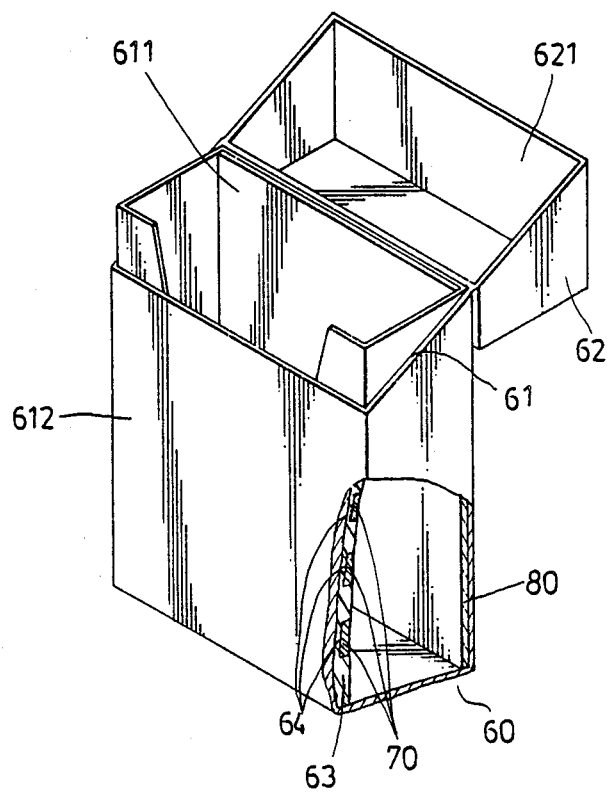
FIGS. 2 and 3 are perspective view of another preferred embodiment of the invention.
Figure 3:
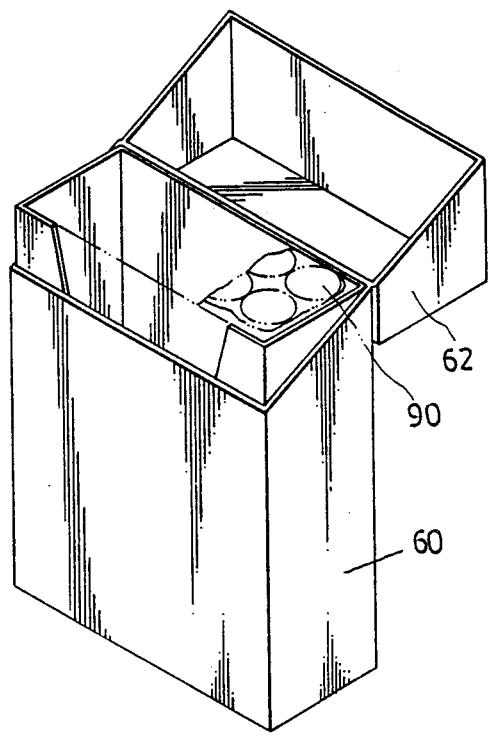

Another embodiment of the invention is shown in FIGS. 2 and 3, including a tobacco case 60 which is made of a plastic material and which has a back wall 611, a front wall 612, two side walls 61, and a hinged cover 62.

To the inner side of the front wall 612 is connected adhesively a plate member 63 which has parallel grooves 64. Magnetic pieces 70 are fitted respectively in the grooves 64 in such a manner that like poles are arranged at the same side.

To the inner side of the back wall 612 is connected a magnetizable metallic plate 80 by bonding adhesively or integrally molding. Due to the magnetic pieces 70 and the plate 80, a magnetic field of high density is induced in the inside of the box 60.

Figure 4:
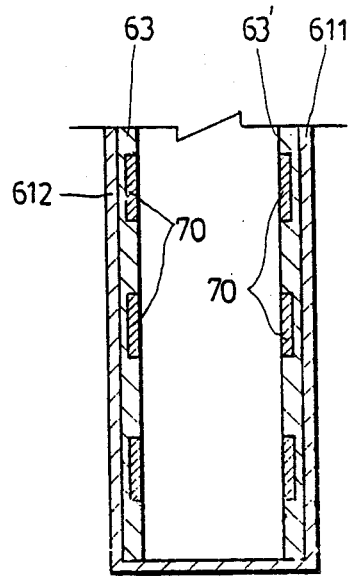
FIG. 4 is a fragmentary sectional view of still another preferred embodiment of the invention.

FIG. 4 shows still another embodiment of the invention which has a construction substantially similar to that of the embodiment of FIGS. 2 and 3 except that the back wall 611 is connected with a plate 63' similar to the plate 63 having parallel grooves for receiving magnetic pieces 70. The number of the magnetic pieces 70 at the front wall 612 is equal to that of the back wall 611. The same poles of the magnetic pieces 70 in the plate 63' are arranged at the side adjacent to the same poles of the magnetic pieces 70 in the plate 63.

Experiments were made with the device of the present invention. Table 1 shows the results of the experiments.

TABLE 1

| Sample | Holding time in the container of the invention | Result |
| --- | --- | --- |
| Wine 1 | 6–10 min | acidity and piquante flavor decrease |
| Soy sauce | 10–15 min | basicity decreases, flavor is improved. |
| Wine 2 | 10–15 min | flavor is improved, piquante flavor decreases |
| Tobacco | 10–40 min | piquante flavor decreases. |

With the invention thus explained, it is apparent that numerous modification and variations can be made without departing from the scope of the present invention. It is therefore intended that the invention be limited only as indicated in the appended claims.

What I claim is:

1. An apparatus for improving the flavor of and removing the piquante flavor of a fermented substance such as wine, soy sauce, tobacco or the like comprising:
   a container including a surrounding side wall; and
   a plurality of elongated magnetic members mounted on an inner side of said surrounding side wall, each of said magnetic members having a first pole and a second pole, said first pole of each of said magnetic members being placed adjacent to said first pole of at least one of other adjacent said magnetic members, said second pole of each of said magnetic members being placed adjacent to said second pole of at least one of other adjacent said magnetic members, said magnetic members inducing a magnetic field inside said container.

2. An apparatus as claimed in claim 1, in which said surrounding wall is cylindrical and has an inner cylindrical shell made of a magnetically conductive material, and an outer cylindrical shell, said inner and outer shells confining an annular chamber, wherein said magnetic members are annular and provided around said inner shell in said annular chamber, said annular magnetic members being stacked on each other.

3. An apparatus as claimed in claim 1, in which said container has a rectangular cross section and includes a front wall, a rear wall, and two side walls interconnecting said front wall and said rear wall, each of said front wall and said rear wall having elongated spaced apart parallel grooves extending in a direction from one of said side walls to said other side wall, wherein said magnetic members are bar-like members each received in each of said grooves, said first poles of said magnetic members being placed adjacent to one of said side walls and said second poles of said magnetic members being placed adjacent to the other said side wall.

4. An apparatus as claimed in claim 1, wherein said container has a rectangular cross section and includes a front wall, a rear wall, and two side walls interconnecting said front wall and said rear wall, said front wall having elongated spaced apart parallel grooves, wherein said magnetic members are bar-like members each received in each of said grooves, said first poles of said magnetic members being in alignment, said container further having a magnetizable metallic panel at the inner side of said rear wall.

* * * * *